US008903956B2

(12) United States Patent
Acedo et al.

(10) Patent No.: US 8,903,956 B2
(45) Date of Patent: *Dec. 2, 2014

(54) ON-DEMAND VIRTUAL STORAGE CAPACITY

(75) Inventors: Mario Francisco Acedo, Tucson, AZ (US); Ezequiel Cervantes, Tucson, AZ (US); Paul Anthony Jennas, II, Tucson, AZ (US); Jason Lee Peipelman, Vail, AZ (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/566,703

(22) Filed: Aug. 3, 2012

(65) Prior Publication Data

US 2012/0303755 A1    Nov. 29, 2012

Related U.S. Application Data

(63) Continuation of application No. 12/062,617, filed on Apr. 4, 2008, now Pat. No. 8,271,612.

(51) Int. Cl.
*G06F 15/16* (2006.01)
*G06F 3/06* (2006.01)
*H04L 29/08* (2006.01)
*G06Q 40/00* (2012.01)

(52) U.S. Cl.
CPC .............. *H04L 67/16* (2013.01); *G06F 3/067* (2013.01); *H04L 67/1097* (2013.01); *G06F 3/0631* (2013.01); *G06Q 40/00* (2013.01); *G06F 3/0605* (2013.01); *G06F 3/0644* (2013.01)
USPC ................ 709/219; 709/217; 455/558; 726/4

(58) Field of Classification Search
USPC .......................... 709/217, 219; 455/558; 726/4
See application file for complete search history.

(56) References Cited

U.S. PATENT DOCUMENTS

| 5,819,020 | A | | 10/1998 | Beeler, Jr. |
| 6,108,671 | A | * | 8/2000 | Ogawa ................... 707/999.202 |
| 6,128,709 | A | * | 10/2000 | Autechaud et al. ........... 711/151 |
| 6,324,627 | B1 | | 11/2001 | Kricheff et al. |
| 6,349,373 | B2 | | 2/2002 | Sitka et al. |
| 6,516,342 | B1 | | 2/2003 | Feldman et al. |
| 6,795,830 | B1 | | 9/2004 | Banerjee et al. |

(Continued)

OTHER PUBLICATIONS

Lowell, David E. et al., "Devirtualizable Virtual Machines Enabling General, Single-Node, Online Maintenance", ASPLOS 2004, pp. 212-223.

(Continued)

*Primary Examiner* — Michael C Lai
(74) *Attorney, Agent, or Firm* — Griffiths & Seaton PLLC

(57) ABSTRACT

A system, method, and computer program product for providing on-demand storage capacity on a remote storage server to a customer is provided. A virtual array site code is received. The remote storage server is virtually connected to a local storage server of the customer in response to receiving the virtual array site code. Subsequent to receiving an activation request from the customer, a command is executed on the remote storage server to provide the virtual array site code to the customer. A virtual array site object is created on the local storage server corresponding to an array site object on the remote storage server.

19 Claims, 9 Drawing Sheets

(56) References Cited

U.S. PATENT DOCUMENTS

| | | | |
|---|---|---|---|
| 6,826,613 B1 | 11/2004 | Wang et al. | |
| 7,028,218 B2 | 4/2006 | Schwarm et al. | |
| 7,149,855 B2 | 12/2006 | Chen et al. | |
| 7,165,160 B2 | 1/2007 | Kodama | |
| 7,266,719 B1 * | 9/2007 | LeCrone et al. | 714/5.11 |
| 7,302,539 B2 * | 11/2007 | Korgaonkar et al. | 711/162 |
| 7,502,628 B2 * | 3/2009 | Imaeda | 455/558 |
| 7,720,935 B2 * | 5/2010 | Anantha | 709/219 |
| 2002/0049778 A1 * | 4/2002 | Bell et al. | 707/200 |
| 2002/0103907 A1 | 8/2002 | Petersen | |
| 2003/0074529 A1 | 4/2003 | Crohas | |
| 2003/0145045 A1 | 7/2003 | Pellegrino et al. | |
| 2003/0172146 A1 | 9/2003 | Collins | |
| 2005/0050292 A1 * | 3/2005 | Oh | 711/170 |
| 2005/0114619 A1 | 5/2005 | Matsuo et al. | |
| 2006/0161810 A1 * | 7/2006 | Bao | 714/6 |
| 2006/0190281 A1 | 8/2006 | Kott et al. | |
| 2007/0011361 A1 | 1/2007 | Okada et al. | |
| 2007/0100979 A1 | 5/2007 | Soland et al. | |
| 2007/0233992 A1 | 10/2007 | Sato | |
| 2008/0005121 A1 | 1/2008 | Lam et al. | |
| 2008/0184125 A1 * | 7/2008 | Suleiman et al. | 715/734 |
| 2008/0270594 A1 * | 10/2008 | McJilton et al. | 709/224 |
| 2009/0037424 A1 | 2/2009 | Susairaj et al. | |
| 2009/0089862 A1 * | 4/2009 | Sun | 726/4 |
| 2009/0198699 A1 | 8/2009 | Acedo et al. | |
| 2009/0198710 A1 * | 8/2009 | Acedo et al. | 707/100 |

OTHER PUBLICATIONS

Sivathanu, Muthian et al., "Improving Storage System Availability With D-GRAID", ACM Transactions on Storage, vol. 1, No. 2, May 2005, pp. 131-170.

Stewart, Graeme A. et al., "Storage and Data Management in EGEE", Australian Computer Society, Inc., 2007, pp. 69-77.

* cited by examiner

ON-DEMAND VIRTUAL STORAGE CAPACITY

REFERENCE TO RELATED APPLICATIONS

The present application is a Continuation of U.S. patent application Ser. No. 12/062,617 filed on Apr. 4, 2008, which is now U.S. Pat. No. 8,271,612, the contents of which are incorporated herein by reference and U.S. patent application Ser. No. 12/062,617 is related to U.S. Non-Provisional Applications 12/062,619 and 12/062,634, which were concurrently filed, and are incorporated herein by reference.

BACKGROUND OF THE INVENTION

1. Field of the Invention

The present invention relates in general to computers, and more particularly to a method and computer program product for providing on-demand storage capacity on a remote storage server to a customer.

2. Description of the Related Art

Computers, and accompanying data storage, are commonplace in today's society. Individuals, businesses, organizations, and the like have a need for a certain amount of data storage. Historically, data has been stored on local storage devices, such as tape drives, hard disk drives (HDDs), and removable media such as compact discs (CDs) and digital versatile discs (DVDs). As more of society becomes digital, the need for data storage has generally increased.

In many cases, customers may see an immediate need for additional data storage. For example, a business may obtain a large new account, or a service provider may require increased storage capacity to provide support for a particular upcoming event, such as an election. Vendors of data storage have seen to this need, in some cases, by including unused storage in the hardware provided to the customer, but in a disabled state. This allows the customer to "purchase" the unused storage on-demand at a later date. The storage is enabled when requested, and is immediately available. This feature may be referred to as "step-ahead storage."

Step-ahead storage in the traditional sense may be problematic to a vendor in some situations. For example, regardless of whether a customer actually uses the storage, the vendor provides storage hardware at a fixed cost. Additionally, the added hardware is generally fixed to a particular machine, so that step-ahead storage capacity allocated to a first machine may not be usable by a second machine which has run out of storage space. Finally, if the amount of step-ahead storage is underestimated at time of purchase, any storage requested beyond the original amount must be installed manually with the accompanying long and costly install times normally associated with installing new or additional hardware.

SUMMARY OF THE INVENTION

In view of the foregoing, a need exists for a system, method and computer program product for providing on-demand storage capacity to a customer. Accordingly, in one embodiment, by way of example only, a method of providing on-demand storage capacity on a remote storage server to a customer is provided. A virtual array site code is received. The remote storage server is virtually connected to a local storage server of the customer in response to receiving the virtual array site code. A virtual array site object is created on the local storage server corresponding to an array site object on the remote storage server.

In another embodiment, again by way of example only, a system for providing on-demand storage capacity to a customer is provided. A remote storage server is in communication with a local storage server of the customer. The remote storage server is configured to, in response to the receipt of a virtual array site code, virtually connect to the local storage server, and create a virtual array site object on the local storage server corresponding to an array site object on the remote storage server.

In still another embodiment, again by way of example only, a computer program product for providing on-demand storage capacity on a remote storage server to a customer is provided. The computer program product comprises a computer-readable storage medium having computer-readable program code portions stored therein. The computer-readable program code portions include a first executable portion for receiving a virtual array site code, a second executable portion for virtually connecting the remote storage server to a local storage server of the customer in response to receiving the virtual array site code, and a third executable portion for creating a virtual array site object on the local storage server corresponding to an array site object on the remote storage server.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for providing and configuring on-demand storage capacity for a local storage server. These mechanisms are facilitated by a remote storage server in communication with the local storage server. In this manner, the mechanisms provide step-ahead storage functionality without the possible drawbacks previously described. The mechanisms of the illustrative embodiments may be implemented in any data processing system. The illustrative embodiments may be adapted to use existing storage configuration commands to configure and modify the on-demand storage. As a result, the mechanisms described below may be implementable without additional skill required on the part of a technician or user. As with traditional step-ahead storage, once the on-demand storage is activated, the customer will see new array sites, or a portion of the remote storage server's storage capacity, that appear on the target machine.

Figure 1:
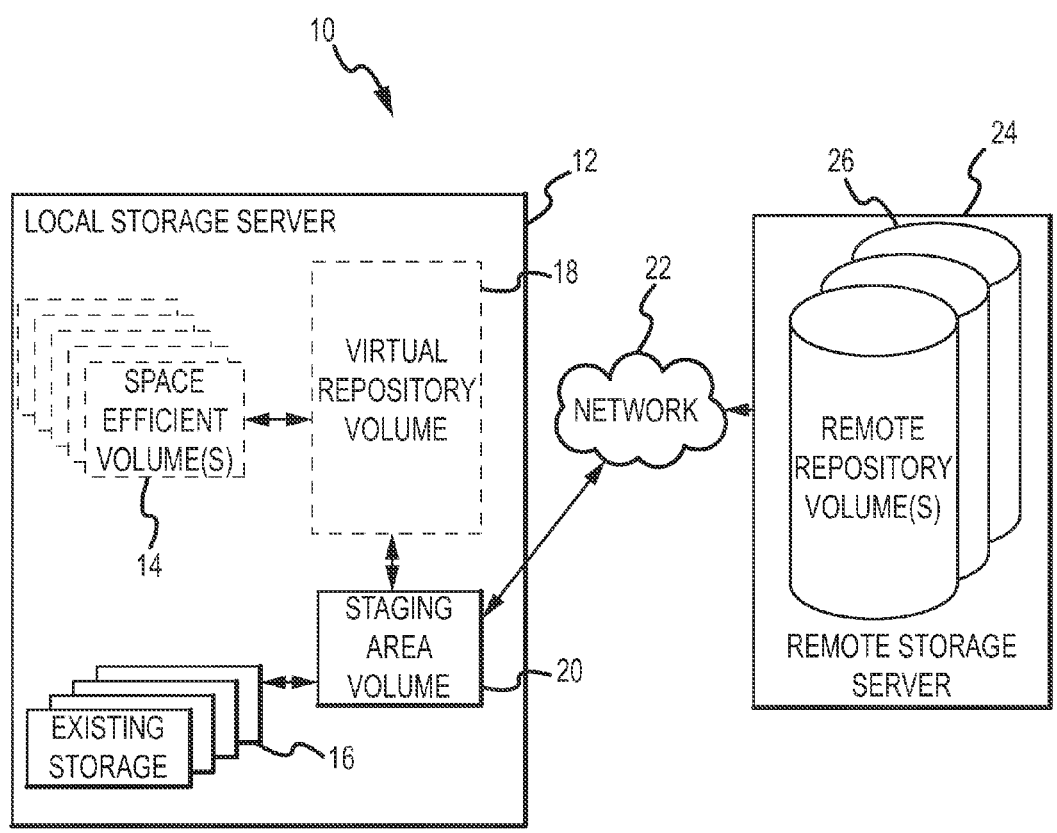
FIG. 1 depicts an example of a data storage system architecture.

FIG. 1 hereafter provides one example of a data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 is an exemplary block diagram of data storage system architecture 10 in which exemplary aspects of an illustrative embodiment may be implemented. As shown in FIG. 1, a local storage server 12, associated with a particular customer, includes a number of space efficient volume(s) 14. In addition, the local storage server includes a number of existing, or traditional storage devices 16 (such as conventional hard disk drives, for example). Local storage server 12 is connected through a network 22 to a remote storage server 24. Remote storage server 24 includes a number of remote repository volumes 26.

Space efficient volumes 14 are shown in communication with a virtual repository volume 18. Virtual repository volume 18 as well as storage devices 16 are in communication with a staging area volume 20, and in turn, connected to network 22. Space efficient volumes 14 and storage devices 16 both may receive read and write commands from a user computing device that issues read and write commands to a non-volatile memory, such as a personal computer, PDA, laptop, MP3 player, or other device. Space efficient volumes 14 differ, however, from storage devices 16 in that no physical space is reserved on the volumes 14 to hold user data directly, as in storage devices 16. Rather, space efficient volumes 14 may be a collection of metadata that can point to locations in the local storage server, such as the virtual repository volume 18.

Virtual repository volume 18 reserves no physical space on the local storage server 12 to hold user data directly. Instead, virtual repository volume 18 contains metadata for mapping purposes, a reference to the staging area volume 20 and a host port World Wide Port Name (WWPN). The host port specified may be connected by network 22, either directly or indirectly, to a remote storage server 24 having a number of remote repository volume(s) 26. The metadata indicates a physical location on a storage system where the user data exists, and may include a bit which indicates if the user data exists on the local storage server 12 (the assigned staging area volume 20) or on the remote repository 26 set up to communicate with a particular space efficient volume 14.

Staging area volume 20 holds user data temporarily when the data is either waiting to be copied to the remote storage server 24, or as a caching area where recently read/written information is stored so that fewer calls to the remote storage server 24 are made. Increasing the size of the staging area volume 20 in relation to the virtual repository volume 18 will, in effect, increase performance at the cost of physical space usage on the local storage server 12. In one embodiment, the staging area volume 20 is sized based on an estimation of bandwidth between the staging area volume 20 and the network 22, and anticipated demand for storage throughput. In one embodiment, staging area volume 20 includes an area sufficient to store S bytes of data, such that S=F−B, wherein F equals the expected largest file size, and B equals the expected bandwidth to the remote storage server 24. In one embodiment, virtual repository volume 18 is local to the staging area volume 20, and the staging area volume 20 is remote to the remote storage server 24.

Network 22 is a network connection providing communication between geographically separated devices. In one embodiment, network 22 is the Internet. Network 22 connects remote computing devices, with a user device (not shown) at one end and the remote storage server 24 at the other.

Remote storage server 24 holds user data in a persistent, long-term manner. Remote storage 24 responds to reads, writes, allocate, and deallocate messages sent from the local storage server 12. The physical capacity of the remote storage server 24 should be exactly the same as the virtual capacity defined for the virtual repository volume 18, and thereby, the space efficient volumes 14. In one embodiment, the physical capacity of the remote storage server 24 may be adjusted with a command configured to increase and/or decrease storage allocations. In one embodiment, the remote repository volumes 26 include an area sufficient to store R bytes of data. In one embodiment, $S/R \leq X$, wherein X is a predetermined constant. In one such embodiment, X is less than 0.10. In other embodiments, X is a negligible number such that the total storage in the staging area volume 20 is a negligible number compared to the total storage in the remote storage server 24. For example, in one embodiment, the staging area volume 20 can store 5 gigabytes, whereas the remote storage server 24 can store 5 petabytes allocated over several remote repository volumes 26.

Consider the following example of a method for storing data, in accordance with one aspect of the invention. As a first step, a data storage system 10 including a number of space efficient volumes 14, one or more virtual repository volumes 26, staging area volume(s) 20 and a remote storage server 24 incorporating a number of remote repository volumes 26 is established. The virtual repository volume 18 includes a first pointer to the staging area volume 20, and the staging area volume 20 includes a second pointer to the remote storage server 24, and thereby, the remote repository volumes 26. The virtual repository volume 18 receives data, and stores the received data in the staging area volume 20 based on the first pointer. In one embodiment, the virtual repository volume 18 does not physically store any user data.

The stored data is transferred to the remote repository volumes 26 based on the second pointer. The transfer is, in one embodiment, synchronous. In other embodiments, the transfer is asynchronous. The synchronous/asynchronous aspect is addressed further below. In one embodiment, a remote repository command is received and the size of the remote repository volumes 26 are adjusted based on the remote repository command. For example, a service provider can supply customers with remote repository services sized to consumer needs. Thus, the service provider can maintain a zettabyte of storage, for example, comprising volumes of smaller storage units, such as terabytes.

In one embodiment, the virtual repository volume 18 and staging area volume 20 are disposed at a first location, and the remote repository volumes 26 are geographically offset from the first location. Thus, the storage of data does not require storage at the staging area site, and can be sited to take advantage of real estate costs, service costs, electrical costs, or the like. When the transfer between the staging area volume 20 and remote repository volumes 26 is synchronous, the staging area volume 20 may have a substantially reduced volume for storage. In one embodiment using a synchronous data transfer, the staging area has no physical area for persistent data storage. In such an embodiment, the actions affecting the staging area volume are solely initiated by an external actor, either a user or the remote repository volume 26. When the user initiates a write to a particular space efficient volume 14, the information is immediately transmitted to a particular remote repository volume 26. As with legacy space efficient operation, if the track being written to on a space efficient volume 14 has not previous been written to, space is allocated on the fly in the remote storage server 24. Once the write completes on a remote repository volume 26, an acknowledgement is sent back to the local storage server 12 along with the physical track location where the data was written in the remote storage server 24. This location is recorded in the metadata in the virtual repository volume 18, and finally, the user process is sent confirmation that the write competed. When the user initiates a read from a space efficient volume 14, the read is redirected to the virtual repository volume 18, which, in turn, is redirected (along with the known physical location of the user data) to a designated remote repository volume 26. The information is then sent back to the local storage server 12 and returned to the user process.

In asynchronous mode, or in embodiments featuring a non-zero sized staging area, any user write requests are initially handled in the staging area volume 20 to be transferred to the remote storage server 24 at a later time. While the data exists in the staging area volume 20, any reads from the space efficient volumes 14 for this information will not need to go over the network. There is a background thread, termed the deferred destage thread, that periodically scans the staging area volume 20 and copies any outstanding information to the remote repository volumes 26 in the remote storage server 24. After the data is copied, the track in the staging area volume 20 is marked as available. Any future writes will still read from the staging area volume 20 until it is decided by the caching algorithm that this track should be used by new incoming data. Any appropriate caching algorithms can be used, including algorithms based on bandwidth properties, data security properties, time properties, or the like. Whenever the data is no longer valid in the staging area, the virtual repository volume 18 metadata is updated to point to the valid location in a remote repository volume 26.

A data access frequency may be determined based on the storage in the staging area volume 20. The data access frequency is metadata associated with the number of times in a predetermined time span a particular data or file has been the subject of a read/write. The more commonly, either on average or in absolute terms, a particular file or data is subject of a read/write, the higher the data access frequency. The determined data access frequency may be compared to a threshold frequency. The threshold frequency is associated with a number of read/writes that is determined to affect whether the read/write data is transferred to the remote storage server 24 or maintained at the staging area volume 20. In one embodiment, the threshold frequency is a predetermined frequency. In another embodiment, the threshold frequency is a user-configured frequency. In yet another embodiment, the threshold frequency is determined responsive to a history of data access. In one such embodiment, the threshold frequency is dynamically determined so that the most accessed N number of data/files are stored at the staging area volume 20, while the remaining files are stored at the remote storage server 24.

In one embodiment, data/files are transferred for storage on the staging area volume 20 from a remote repository volume 26 based on the comparison of the determined data access frequency and threshold frequency. Thus, as data read traffic changes, the system dynamically adjusts the location of the stored files/data so that the most frequently accessed data/files are stored at the staging volume. In one embodiment, data/files are transferred for storage on the staging area volume 20 from the remote storage server based on the comparison of the determined data access frequency and threshold frequency, as well as the size of the data/files and staging area volume 20 storage capacity. Any less frequently accessed data/files on the staging area volume 20 are then transferred to the remote storage server 24. This dynamic storage allocation decreases access latency.

Figure 2:
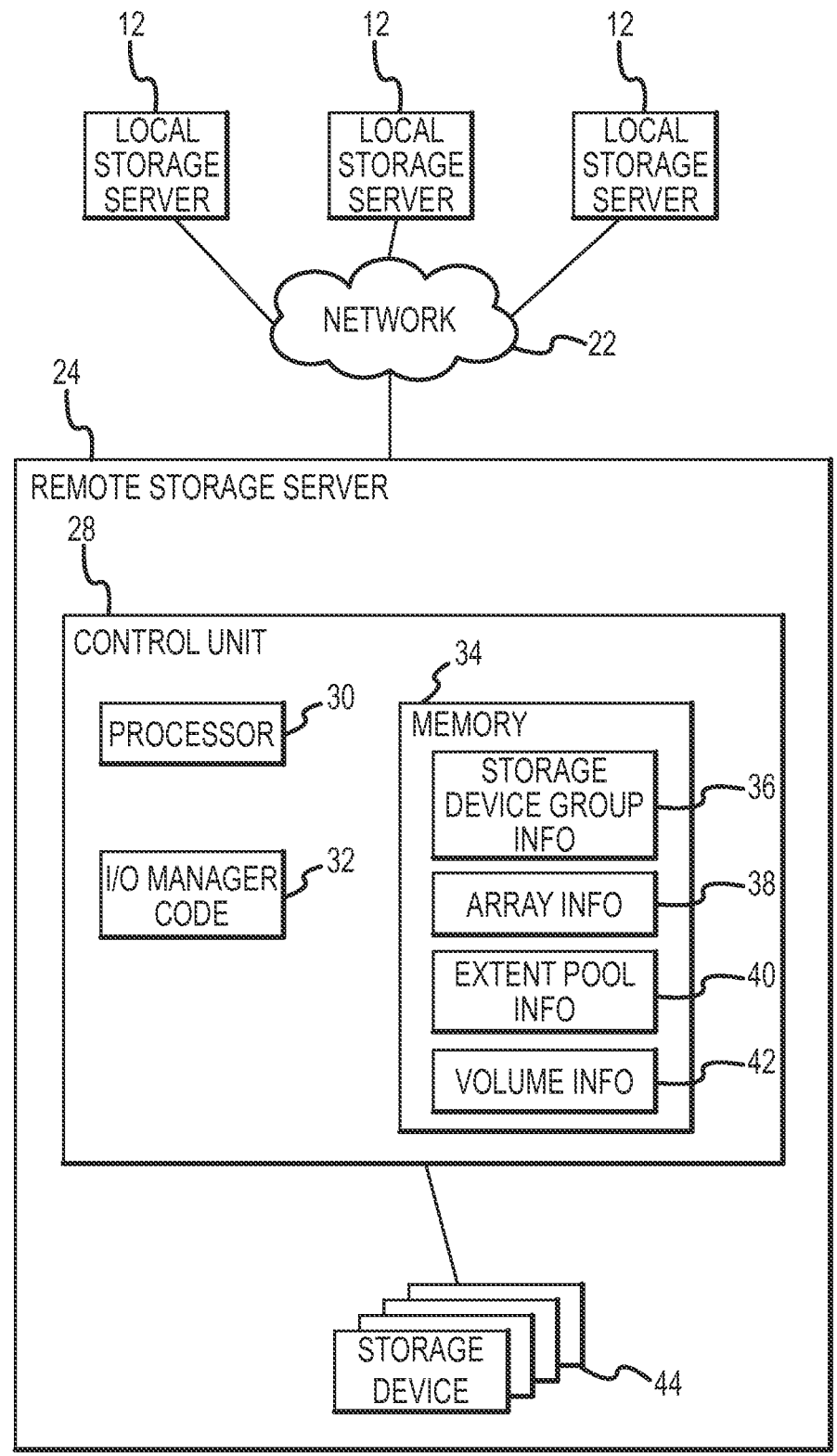
FIG. 2 depicts an exemplary remote storage server.

Turning to FIG. 2, the exemplary embodiment of a remote storage server 24 is illustrated in additional detail. Multiple local storage server sites 12 communicate Input/Output (I/O) requests as previously described. These requests are directed to remote repository volumes 26 (FIG. 1) configured in one or more storage devices 44 to a control unit 28 over network 22, where the control unit 28 manages access to the storage devices 44. The control unit 28 includes a processor 30 that executes I/O manager code 32 to configure and manage remote repository volumes/storage devices 44 in the remote storage server 24. A volume comprises a logical representation of a section of the storage space configured on one or more storage devices 44 in the remote storage server 24 that ma be accessed by the local storage server sites 12. The control unit 28 includes a memory 34, such as a non-volatile memory and information used to configure volumes in the storage devices 44. The I/O manager code 32 buffers updates and requested data as the data is being transferred between the local storage server sites.

In one embodiment, the control unit 28 maintains information on storage device groups 36 comprising information on groupings of the storage devices 44. Storage device groups may also be referred to as "array sites" as previously described, and generally will be denoted as array sites throughout the following description, as the two terms may be used interchangeably.

In addition, control unit maintains arrays 38, including information on storage arrays configured from the storage devices 44; extent pools 40 comprising groupings of one or more arrays; and volumes 42 comprised of extents of storage space within one or more extent pools. The control unit 28 may comprise a storage server, mainframe, enterprise storage server, storage controller or other device used to manage I/O requests to connected storage devices 44. In this manner, remote storage server 24 may comprise a number of individual storage servers, storage controllers, and the like. The storage devices 44 may comprise suitable storage devices known in the art, such as hard disk drives, which may be from different manufacturers and have different performance, reliability and interface attributes. The arrays may be configured from the storage devices 44 comprising interconnected hard disk drives in suitable configurations known in the art, such as DASD, RAID, JBOD, etc. Because the array sites (storage device groups), arrays, extent pools, and volumes are virtual on the local storage server sites, they are commonly referred to throughout the following disclosure as "virtual." For example, reference to an array as maintained on the remote storage server may be denoted as "virtual array," and so forth.

Figure 3:
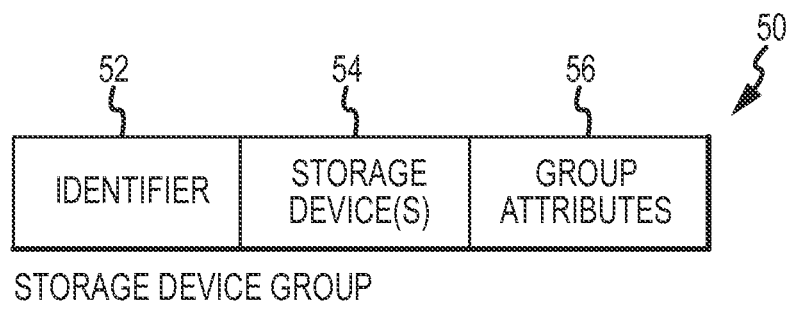
FIG. 3 depicts array site information for a virtual array site.

FIG. 3 illustrates virtual storage device group/array site information 50 maintained for each defined virtual array site, including an identifier 52 of the storage device group, storage devices 54 assigned to the storage device group, and group attributes 56 of the storage devices assigned to the group. For instance, the storage devices 44 (FIG. 2) assigned to an array site may have common attributes, such as the storage device capacity, performance (e.g., revolutions per minute (RPM), data transfer rates, etc.), disk reliability, interfaces, etc. The storage devices 44 assigned to an array site may originate from different vendors. Storage devices 44 assigned to an array are typically automatically selected from the same array site so that the devices selected for the array have the same storage device characteristics, such as the same storage device capacity. In some embodiments, where the array configurations are constrained to certain array configurations, the storage device groups may be organized such that each storage device group is a candidate site for an array configuration, where the RAID configuration of the array is assigned to the storage group when the array is configured. If spare storage devices 44 are configured for one or more arrays, then the spares may also be selected from a given storage device group such that the spares have the appropriate device characteristics for the set of arrays for which they are functioning as a spare device.

Figure 4:
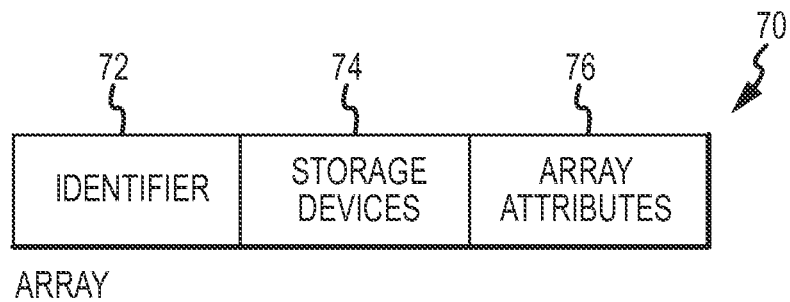
FIG. 4 depicts array information for a virtual array.

FIG. 4 illustrates array information 70 maintained for each virtual array configured from the storage devices 44 (again, FIG. 2), including an array identifier 72, storage devices 74 configured in the array, and array attributes 76. The array attributes 76 may indicate the type of array configuration, e.g., RAID configuration and RAID level, and attributes of the storage devices used in the array configuration, such as performance, reliability, interfaces, etc. When there is a mix of storage device types in the array, the attributes maintained for the array for its storage devices is typically the attributes that a storage device would require in the event that another storage device replaced a failing device within the array. For example, the smallest capacity device in the array would determine the depth of the array and any substitute device would need to have at least that much capacity to be a suitable substitute.

Figure 5:
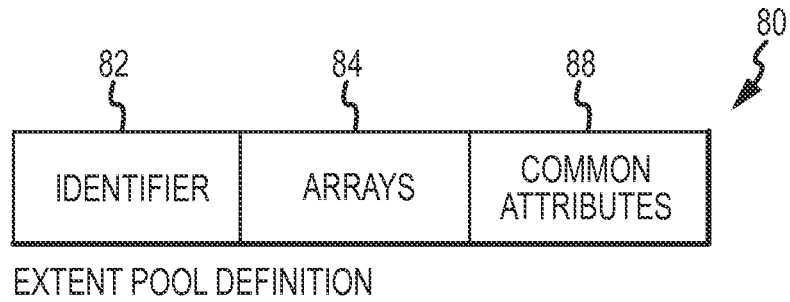
FIG. 5 depicts extent pool information for a virtual extent pool.

FIG. 5 illustrates an extent pool definition 80 for one defined virtual extent pool, including an extent pool identifier 82; arrays assigned to the extent pool 84; and common attributes 88 for the extents in the extent pool. One attribute 88 of the extent pool that is always common is the fixed size of the extents within the extent pool. More than one extent size may be supported within the control unit, but each extent pool may have only one extent size. For instance, in one embodiment, the extent size might be one gigabyte (230 bytes). Each array assigned to the extent pool is divided into an integral number of extents. The mechanism for performing this division may be array dependent, such that each array may have a different capacity and provide a different number of extents. To the degree that the arrays within the extent pool share the common attributes such as RAID type, performance (RPM), interface type), etc., those attributes may be assigned to the extent pool in that all extents within the extent pool share those common characteristics.

Figure 6:
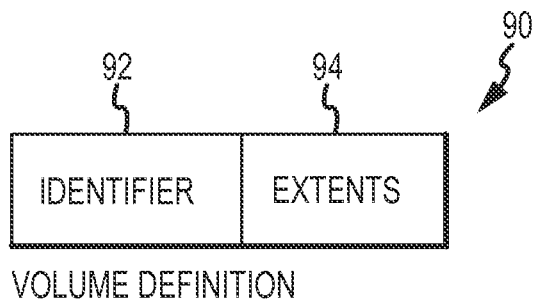
FIG. 6 depicts volume information for a virtual volume.

FIG. 6 illustrates volume information 90 provided for each configured virtual repository volume including the volume identifier 92 and one or more extents 94 assigned to the volume. The I/O manager code 32 (FIG. 2) may present graphical user interface (GUI) pages to users, such as administrators or other users, of the control unit 28 to enable the user to configure storage device groups 36, arrays 38, extent pools 40, and volumes 42 from extents in the extent pools 24.

Figure 7:
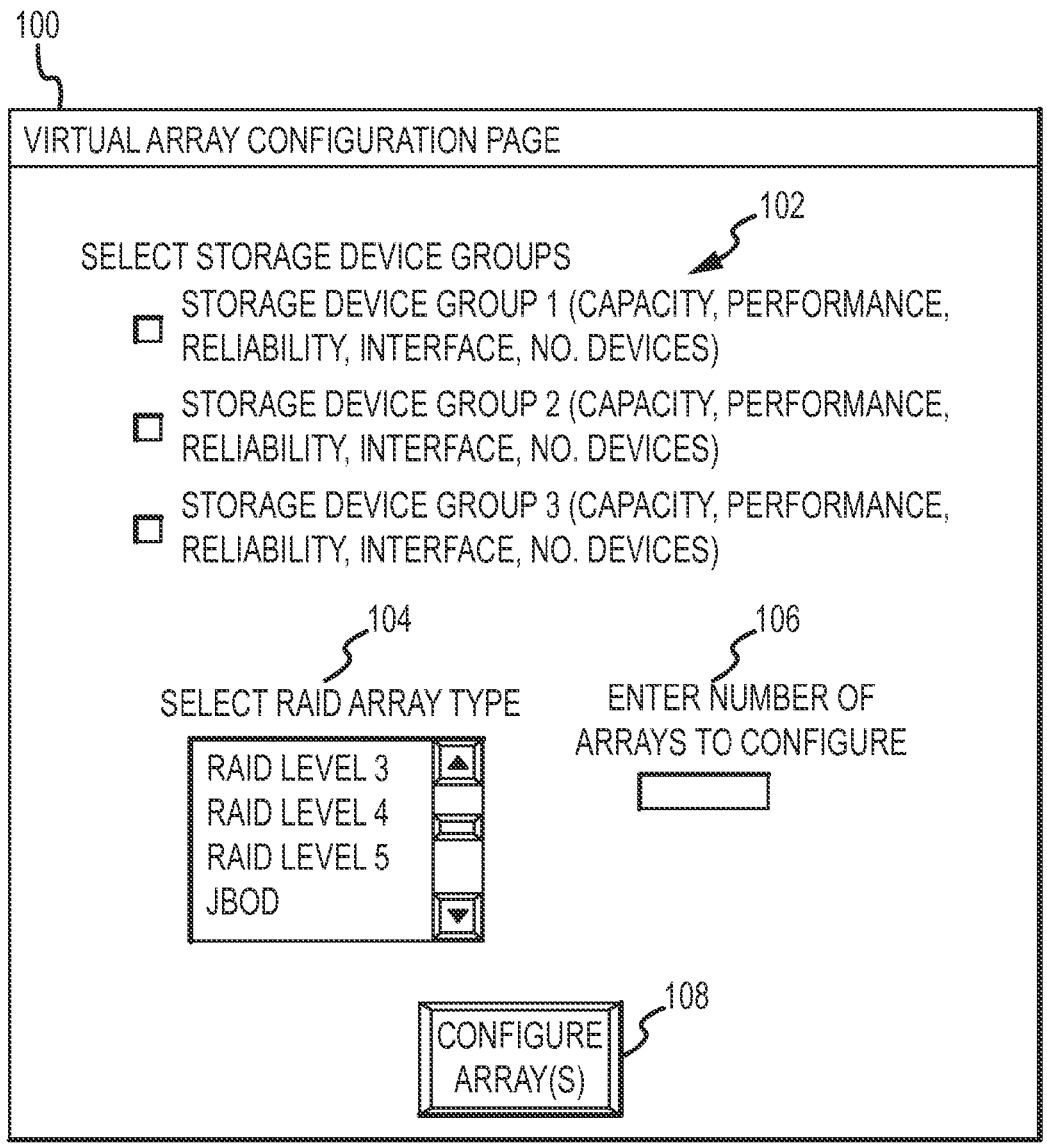
FIG. 7 depicts a virtual array configuration page.

FIG. 7 illustrates a virtual array configuration page 100 displaying storage device groups 102 that the user may select to use to configure a virtual array associated with the virtual repository volumes of the remote storage server. The displayed storage device groups 102 may comprise all storage device groups 50 (FIG. 2) having at least one storage device not already used in a configured array. The user may further select an array configuration type 104 and the number of arrays 106 to configure using the selected configuration type and the selected storage device groups 102. The user may select an array configuration button 108 to initiate the configuration using the entered parameters.

Figure 8:
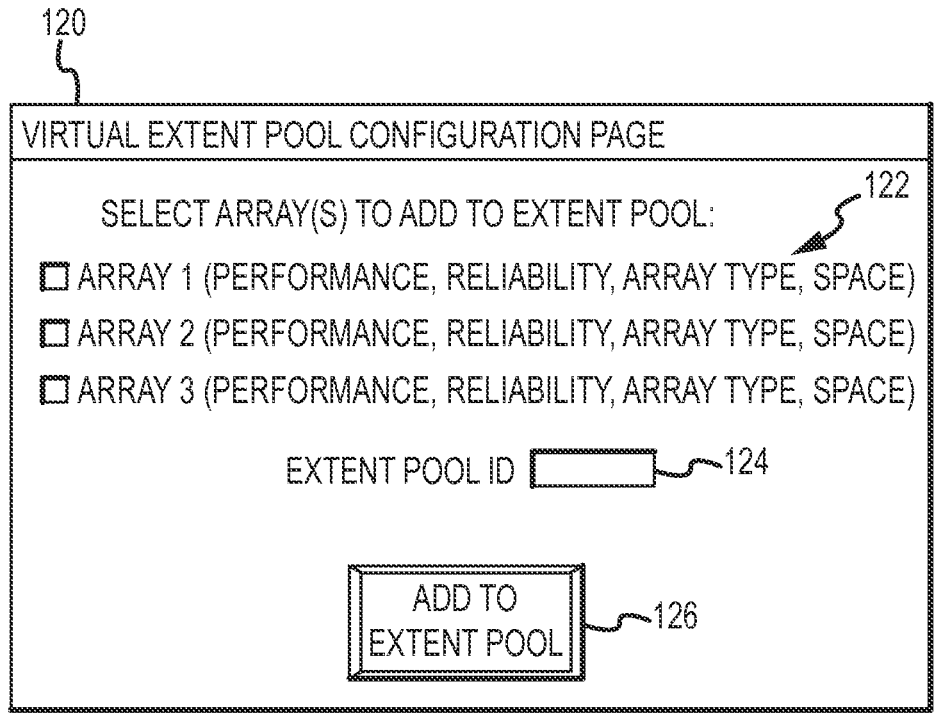
FIG. 8 depicts a virtual extent pool configuration page.

FIG. 8 illustrates a virtual extent pool configuration page 120 in which the user may enter parameters to use to define virtual extent pools. The user may select to assign one or more arrays displayed in the array section 122 to the extent pool identified in entry box 124 and then select button 126 to add the selected one or more arrays 122 to the extent pool identified in extent pool ID box 124. The array section 122 may display all arrays 122 not already assigned to an extent pool.

Figure 9:
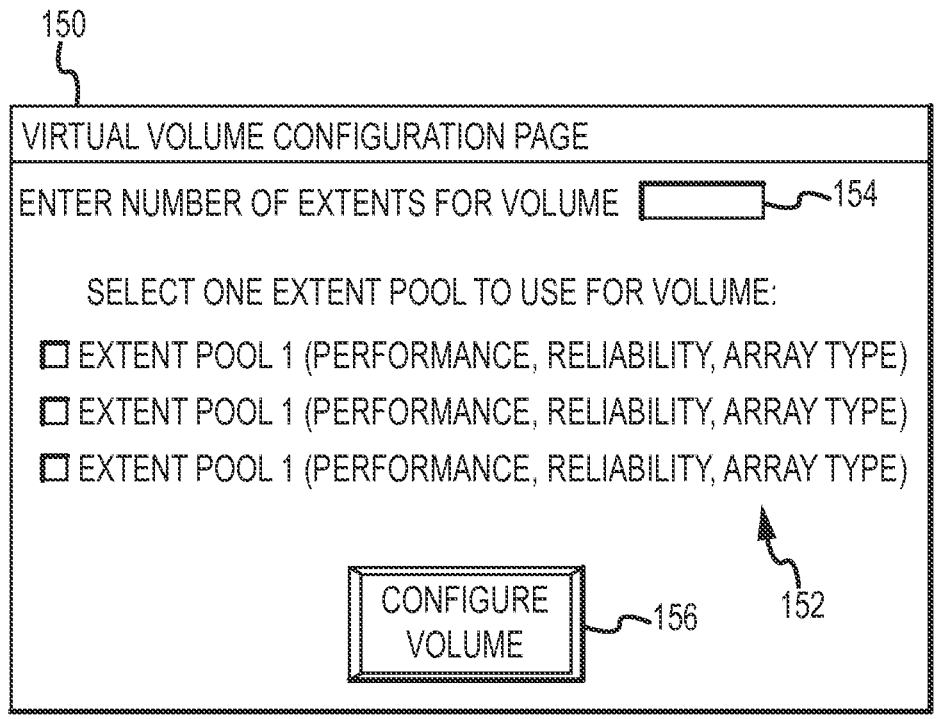
FIG. 9 depicts a virtual volume configuration page.

FIG. 9 illustrates a virtual repository volume configuration page 150 in which the user may enter parameters to use to define virtual repository volumes on the remote storage server. One parameter specified for the volume is the number of extents 154 required to configure the volume. The user Wray select to use extents from one of the extent pools displayed in the extent pool section 152 in the volume being created. The extent pool section 152 may display all extent pools including one or more extents not assigned to a volume 90 (FIG. 6). The set of extents selected to configure the volume typically comes from one extent pool. Since the extent pool consists of the extents with certain common characteristics (such as performance, RAID type, drive reliability, etc.), a logical volume configured from extents within a single extent pool may have the same common characteristics as the extent pool. As such, the provisioning of volumes with certain storage characteristics may be simplified to selecting an appropriate extent pool to configure the volume within that extent pool. In one embodiment, the control unit automatically selects a set of unallocated extents for the volume from the extent pool. In another embodiment, the user may specify certain preferences for how the extents within the extent pool are selected, such as limiting the selection to certain arrays within the extent pool, avoiding certain arrays within the extent pool, or even specifying explicit extents to be used for the volume. At most, the number of arrays that a configured volume may be allocated across is limited to the arrays within the extent pool. As such, the user of the storage system can limit the exposure of an array failure to a limited number of volumes (i.e. the volumes that are configured within the extent pool containing the array). Managing placement of the volumes to specific arrays within the extent pool can further limit the impact of an array failure to a smaller set of configured volumes.

Figure 10:
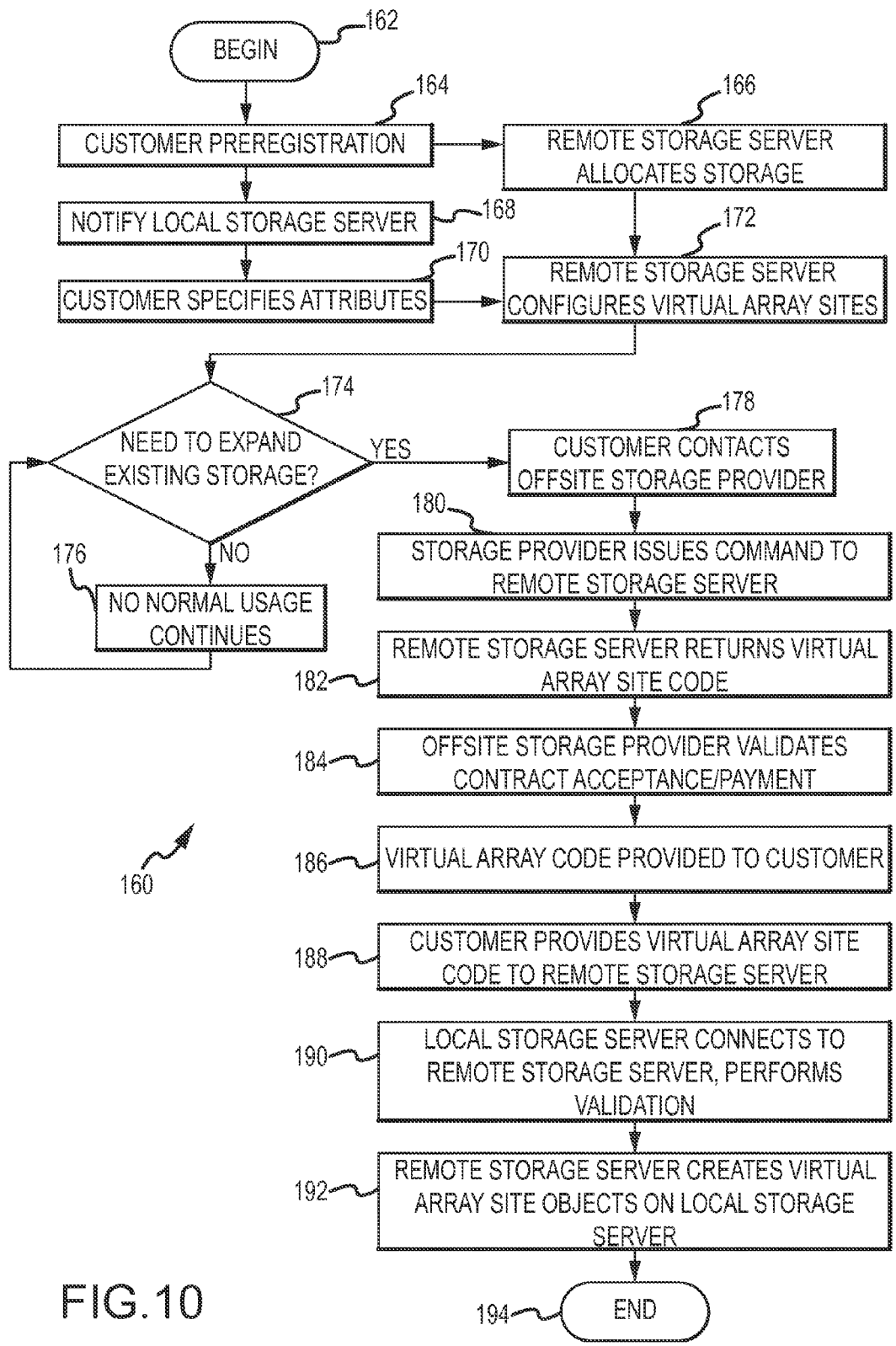
FIG. 10 depicts an exemplary method of operation of a data storage system providing on-demand storage to a customer.

Turning to FIG. 10, an exemplary method 160 depicting an initial setup and operations process of data storage system 10 (FIG. 1) for providing on-demand storage to a customer is illustrated. As one skilled in the art will appreciate, various steps in the method 160 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 160 begins (step 162) with a customer preregistration process. A customer may preregister for on-demand storage capacity with a particular vendor. Such a preregistration process allows the vendor to pre-allocate storage that may be later used by the customer. Depending on the customer and vendor relationship, and further described below, the customer or/and the vendor may then allocate and configure the virtual array sites. In one embodiment, the virtual array sites may be configured by the local storage server as if they were located on the local storage server. The virtual array sites are allocated on the remote storage server (step 166).

Following, or simultaneous to the preregistration process, the local storage server associated with the customer may be notified to set aside space for any logical configuration objects that may be needed when the virtual array sites are initialized and configured (step 168). A customer may, as part of the preregistration process, specify attributes of the virtual array sites based on expected need, prior experience, and the like (step 170). These attributes have been previously described above. Again, a user associated with either the vendor, the customer, or both, may then configure the virtual array sites (step 172) as will be further described. Again, the configuration may be performed by the local storage server, as if the virtual array sites were located on the local storage server. The configuration process may utilize configuration pages such as the virtual array configuration page (FIG. 7), the virtual extent pool configuration page (FIG. 8), and the virtual repository volume configuration page (FIG. 9). Additional details regarding configuring the virtual array sites will be further described below.

Once various attributes of the virtual array sites have been specified, either by the customer providing the attributes to the vendor, or by the vendor selecting those attributes based on customer input, and the virtual array sites have been configured, the local storage server operates as normal. Normal usage continues (step 176) until the customer determines (either by automated process or otherwise) an immediate need to expand existing storage (step 174). Once this occurs, the customer contacts the vendor/offsite storage provider (step 178). Again, this process may occur automatically per a predetermined scheme executing on the local storage server, where the local storage server notifies the provider of the immediate need.

Once the provider receives an activation request from the customer, the provider issues an activation command to the remote storage server (step 180). In response to receiving the activation command, the remote storage server returns a virtual array site code (step 182) for each virtual array site reserved in such a manner. The offsite storage provider may validate further information from the customer, such as a payment or a contract acceptance from customer (step 184). After satisfying such obligations, the virtual array site code is provided to the customer by the provider (step 186).

Once the virtual array site code is received by the customer, the local storage server associated with the customer connects to the remote storage server (step 188) and confirms that the server has virtual array sites reserved for the given virtual array site code provided by the customer to the remote storage server (step 190). In one embodiment, this connection may be virtual in nature, as a physical connection between the local and the remote storage server may have already been established. The remote storage server then creates virtual array site objects on the local storage server of the customer (step 192) that correspond to the array sites reserved on the remote storage server. These virtual array site objects have the same attributes as those created on the remote storage server as configured earlier. The on-demand storage is then activated and operational. Whenever the customer queries array sites on the remote storage server, the virtual array sites hosted by the remote storage server are returned to the customer in addition to existing array sites physically connected to the local storage server (e.g., existing storage 16, FIG. 1). The method 160 then ends (step 194).

FIGS. 11, 12, 13, and 14 illustrates various operations relating to the configuration of the virtual array sites described previously. As will be seen, various attributes associated with the virtual array sites may he specified by a user (whether the user is a customer, a vendor, or both) during the configuration process. Various steps in the configuration process may be, performed by a local storage server as if the virtual array sites were physically located on the local storage server. As one skilled in the art will anticipate, various steps in the following illustrated embodiments may be adapted to he selectable, assignable, allocable, etc, by the customer and/or the vendor, depending on a specific implementation. During the various mechanisms illustrated below, and again as one skilled in the art will appreciate, commands normally directed to within the local storage server are redirected to the remote storage server for processing. For example, a create array command, initiated by the local storage server and normally processed in the local storage server for existing storage, may be redirected to the remote storage server when the local storage server determines that the create array command relates to the creation of virtual array sites associated with the remote storage server.

Figure 11:
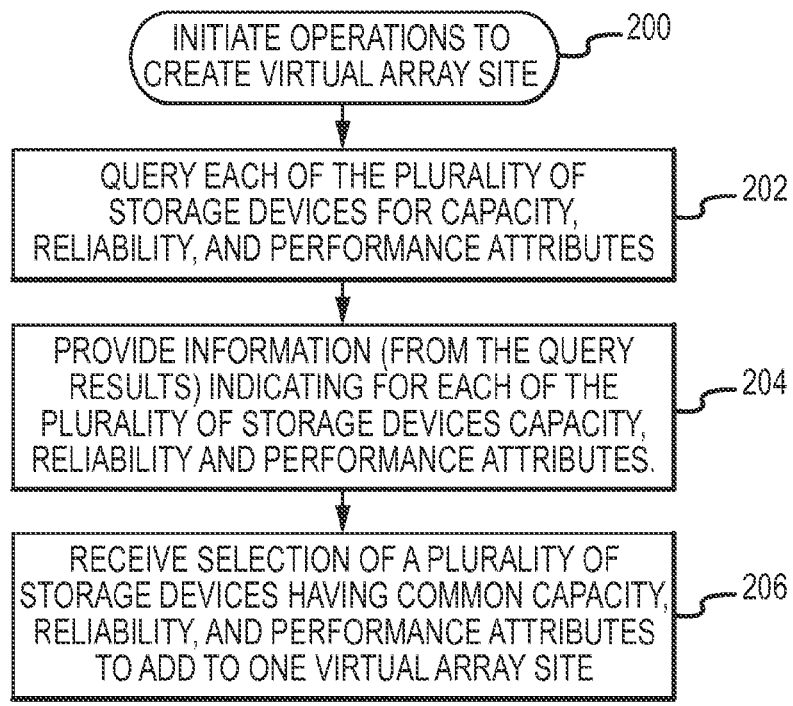
FIG. 11 depicts an exemplary method to create a virtual array site.

Beginning with FIG. 11, operations performed by the I/O manager code 32 (FIG. 2) to define storage groups/array sites 50 (FIG. 3) are illustrated, Prior to or in response to a user initiating (at step 200) operations to define storage device groups 50, the I/O manager 32 queries (at step 202) each of the plurality of storage devices 44 not already assigned to an array site 50 to determine capacity, reliability and performance attributes of unassigned devices. This gathered storage device information may be maintained in a table. Information from the query results indicating for each of the plurality of storage devices capacity, reliability and performance attributes is then provided at step 204) to assist the user in defining array sites. Other attributes may also be queried, such as storage interface used, available storage space, etc. User selection is then received (at step 206) of storage devices 44 and the storage device group 50 is then configured with the selected storage devices 44. The user may select storage devices for one array site 50 having common capacity, reliability and performance attributes to provide a homogeneous group. Alternatively, the control unit 28 (FIG. 2) may automatically form storage device groups for the user by organizing groups for each unique set of device characteristics (e.g., capacity, reliability, performance, etc.).

Figure 12:
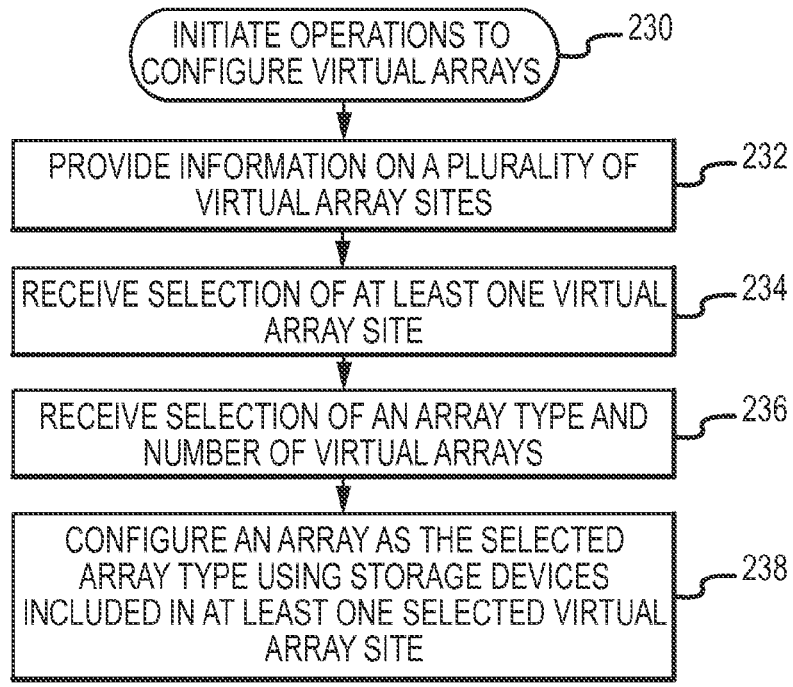
FIG. 12 depicts an exemplary method to configure a virtual array.

FIG. 12 illustrates operations performed by the I/O manager 32 to configure virtual arrays from the storage devices 44 in response to user selections. Upon a user initiating (at step 230) operations to configure an array, information is provided (at step 232) on a plurality of array sites 50, where each array site 50 (FIG. 3) may include storage devices 44 having common storage device attributes. This information may be presented in the virtual array configuration page 100 (FIG. 7). Upon receiving user selection (at step 234) of at least one array site 50, such as in storage device group selection area 102 of page 100 (FIG. 7), and selection (at step 236) of a number of arrays (in field 106) and array type (in list box 104), the I/O manager configures (at step 238) an array to have the selected array type using storage devices identified in field 54 included in at least one selected storage device group 50.

Figure 13:
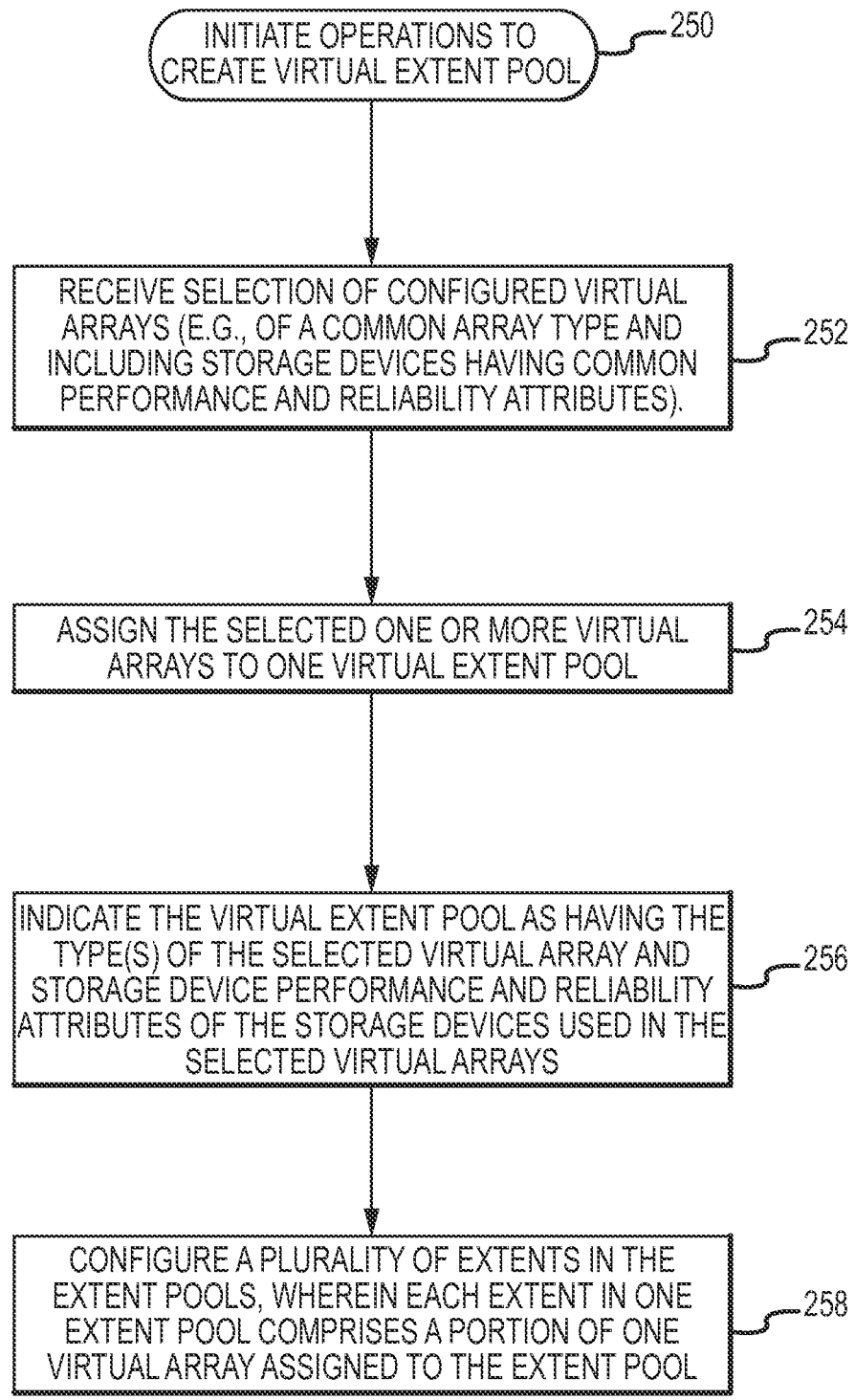
FIG. 13 depicts an exemplary method to create a virtual extent pool.
Figure 14:
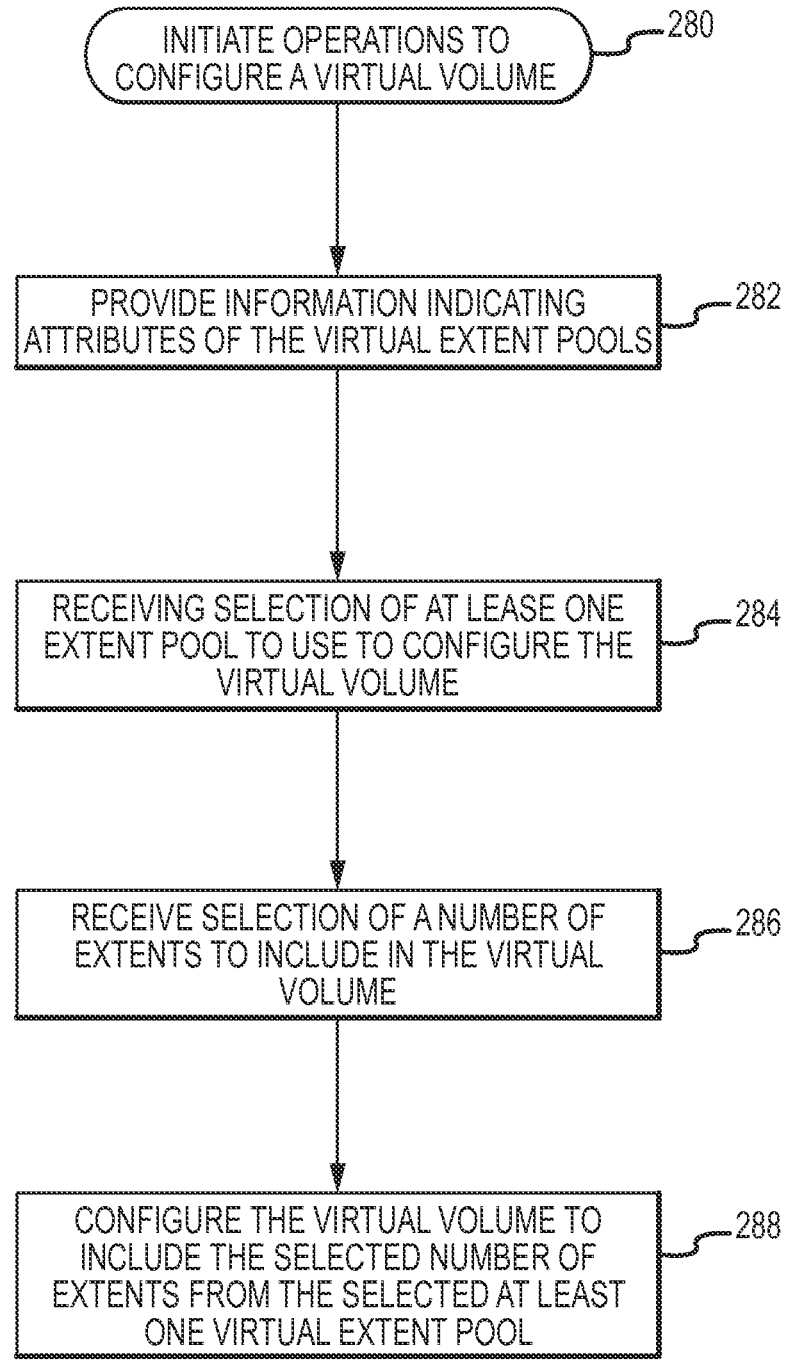
FIG. 14 depicts an exemplary method to create a virtual volume.

FIG. 13 illustrates operations performed by the I/O manager to create a virtual extent pool 80 (FIG. 5) in response to user selection. Upon initiating operations (at step 250) to create an extent pool 80, the I/O manager 32 receives (at step 252) selection of configured arrays from the array selection area 122 of the virtual extent pool configuration page 120 (FIG. 8). The user may select one array or multiple arrays having common attributes, such as a common array type and including storage devices having common performance and reliability attributes. Alternatively, the user may select arrays to include in the extent pool having heterogeneous attributes. The selected arrays are then assigned (at step 254) to the extent pool. The I/O manager 32 may further indicate (at step 256) in the common attribute 88 information for the extent pool created as having the array type(s) of the selected arrays) and storage device performance and reliability attributes of the storage devices used in the selected array(s). A plurality of extents are configured (at step 258) in the created virtual extent pool, where each extent in one extent pool comprises a portion of one array assigned to the extent pool. The extent to array mapping 86 indicates how extents, which may have a fixed size, map to sections of the one or more arrays assigned to the extent pool 80.

FIG. 12 illustrates operations performed by the I/O manager to configure a virtual repository volume 90 (FIG. 6) using extents in one or more selected extent pools. Upon initiating (at step 280) operations to configure a virtual repository volume 90, the I/O manager provides (at step 282) information referring to attributes of the virtual extent pools, such as shown in the extent pool section 152 of the volume configuration page 150 (FIG. 9). The I/O manager receives (at step 284) user selection of one extent pool to use to configure the volume, such as selection of one checkbox in the extent pool section 152 of the virtual volume configuration page 150. In one embodiment, the user may be restricted to select only one extent pool to use to configure a volume, where a volume cannot include extents from multiple extent pools. In alternative embodiment, a volume may include extents from multiple extent pools. The I/O manager further receives (at step 286) user selection of a number of extents to use to configure the volume, such as in the extent number field 154 or through the specification of a volume capacity that indirectly determines the number of extents required. The virtual repository volume 90 is configured (at step 288) to include the selected number of extents from the selected at least one extent pool.

In one embodiment, the user may select to configure a virtual repository volume to use extents in multiple arrays by selecting one extent pool that contains extents from multiple arrays for the volume configuration. The user may make an array selection to select extents based on the user array selection (e.g. from specific arrays, excluding specific arrays, by specifying specific extents, or by specifying some criteria for selecting the desired extents such as "All from any one array"), Alternatively, the user may allow the control unit to select the extents used to configure the volume. In either case, the user may control the set of arrays that the volume may be configured across by selecting which arrays are added to the extent pool when the extent pool is configured.

In one embodiment, the user may select a policy to use to select extent pools from which to configure a virtual repository volume. If the user wants to configure a volume to maximize bandwidth, then the I/O manager may automatically configure the volume as including extents front an extent pool having multiple arrays, so the configured volume has extents spanning multiple arrays, which increases bandwidth. Alternatively, if the user wants to configure a volume to maximize reliability, then the I/O) manager may automatically configure the volume as including extents from an extent pool having only one array, or may limit the selection of extents to a single array within a multi-array extent pool, so that the configured volume has extents from only a single array.

Once the virtual array sites have been configured, a user (again, be it customer, vendor or both), may modify and/or remove a particular virtual array site. The user may submit a removal or modification command from the local storage server to the remote storage server to remove or modify the virtual array site. Once the removal or modification command is received, the remote storage server may remove or modify the virtual array site subject to the selections of the user.

In one embodiment, an event listener may be registered on the remote storage server or elsewhere to provide notification to the local storage server of a storage removal or modification. The event listener may identify specific events, such as a storage modification. The storage modification may include the addition of volumes to a particular virtual array site, or a modification of a user-selected attribute associated with the storage in some way. Once an event is identified by the event listener, the event listener provides notification to the local storage server.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of providing on-demand storage capacity on a remote storage server to a customer, comprising:
 receiving an activation request from the customer to activate the storage capacity;
 receiving a virtual array site code;
 virtually connecting the remote storage server to a local storage server of the customer in response to receiving the virtual array site code;
 confirming a portion of the remote storage server is reserved on the remote storage server for the virtual array site code;
 subsequent to receiving the activation request from the customer, executing a command on the remote storage server to provide the virtual array site code to the customer; and
 creating a virtual array site object on the local storage server corresponding to an array site object on the remote storage server.

2. The method of claim 1, further including preregistering the customer for the on-demand storage capacity.

3. The method of claim 2, wherein preregistering the customer includes allocating a portion of the remote storage server to the customer.

4. The method of claim 2, wherein preregistering the customer includes notifying the local storage server to set aside space for logical configuration objects needed during setup.

5. The method of claim 2, wherein preregistering the customer includes registering an attribute of a storage device specified by the customer.

6. The method of claim 1, wherein the virtual array site object on the local storage server has a capacity and attributes similar to the capacity and the attributes on the remote storage server.

7. The method of claim 1, further including, previous to providing the virtual array site code to the customer, validating a payment from the customer.

8. The method of claim 1, further including, previous to providing the virtual array site code to the customer, validating a contract acceptance from the customer.

9. A system for providing on-demand storage capacity to a customer, comprising:

a remote storage server in communication with a local storage server of the customer, the remote storage server, in response to a receipt of a virtual array site code:
receives an activation request from the customer to activate the storage capacity,
virtually connects to the local storage server,
confirms a portion of the remote storage server is reserved on the remote storage server for the virtual array site code,
subsequent to receiving the activation request from the customer, executing a command on the remote storage server to provide the virtual array site code to the customer, and
creates a virtual array site object on the local storage server corresponding to an array site object on the remote storage server.

10. The system of claim 9, wherein the remote storage server preregisters the for the on-demand storage capacity.

11. The system of claim 9, wherein the remote storage server:
allocates a portion of the remote storage server to the customer,
notifies the local storage server to set aside space for logical configuration objects needed during setup, and
registers an attribute of a storage device specified by the customer.

12. The system of claim 9, wherein the virtual array site object on the local storage server has a capacity and attributes similar to the capacity and the attributes on the remote storage server.

13. The system of claim 9, wherein the remote storage server, previous to providing the virtual array site code to the customer, validates a payment from the customer.

14. The system of claim 9, wherein the remote storage, previous to providing the virtual array site code to the customer, validates a contract acceptance from the customer.

15. A computer program product for providing on-demand storage capacity on a remote storage server to a customer, the computer program product comprising a non-transitory computer-readable storage medium having computer-readable program code portions stored therein, the computer-readable program code portions comprising:
a first executable portion for receiving an activation request from the customer to activate the storage capacity;
a second executable portion that receives a virtual array site code;
a third executable portion that virtually connects the remote storage server to a local storage server of the customer in response to receiving the virtual array site code;
a fourth executable portion that, subsequent to receiving the activation request from the customer, executes a command on the remote storage server to provide the virtual array site code to the customer;
a fifth executable portion for confirming a portion of the remote storage server is reserved on the remote storage server for the virtual array site code; and
a sixth executable portion that creates a virtual array site object on the local storage server corresponding to an array site object on the remote storage server.

16. The computer program product of claim 15, further including:
a seventh executable portion that allocates a portion of the remote storage server to the customer,
an eighth executable portion that notifies the local storage server to set aside space for logical configuration objects needed during setup,
a ninth executable portion that registers an attribute of a storage device specified by the customer, and
a tenth executable portion that receives the activation request from the customer to activate the storage capacity.

17. The computer program product of claim 15, wherein the virtual array site object on the local storage server has a capacity and attributes similar to the capacity and the attributes on the remote storage server.

18. The computer program product of claim 15, further including an eleventh executable portion that, previous to providing the virtual array site code to the customer, validates a payment or contract acceptance from the customer.

19. A method of providing on-demand storage capacity on a remote storage server to a customer, comprising:
receiving an activation request from the customer to activate the storage capacity;
receiving a virtual array site code, wherein the virtual array site code is provided by the remote storage server to the customer for a reserved portion of the remote storage server;
virtually connecting the remote storage server to a local storage server of the customer in response to receiving the virtual array site code, the virtual array site code returned to the remote storage server by the customer for the reserved portion of the remote storage server;
subsequent to receiving the activation request from the customer, executing a command on the remote storage server to provide the virtual array site code to the customer; and
creating a virtual array site object on the local storage server corresponding to an array site object reserved on the remote storage server, wherein attributes created on the remote storage server are the same for both the virtual array site object and the array site object.

* * * * *